United States Patent
Zhou

(10) Patent No.: US 10,169,640 B2
(45) Date of Patent: *Jan. 1, 2019

(54) METHOD FOR FINGERPRINT IDENTIFICATION AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,928

(22) Filed: May 24, 2018

(65) Prior Publication Data

US 2018/0268186 A1 Sep. 20, 2018

Related U.S. Application Data

(63) Continuation of application No. 15/846,236, filed on Dec. 19, 2017, which is a continuation of application No. PCT/CN2016/087778, filed on Jun. 29, 2016.

(30) Foreign Application Priority Data

Mar. 10, 2016 (CN) .......................... 2016 1 0137655

(51) Int. Cl.
 *G06K 9/00* (2006.01)
(52) U.S. Cl.
 CPC .......... *G06K 9/001* (2013.01); *G06K 9/0002* (2013.01); *G06K 9/0008* (2013.01); *G06K 9/00013* (2013.01)
(58) Field of Classification Search
 None
 See application file for complete search history.

(56) References Cited

U.S. PATENT DOCUMENTS

| | | | |
|---|---|---|---|
| 8,379,943 B2 | 2/2013 | Chiu | |
| 2012/0264637 A1* | 10/2012 | Wiener-Kronish | C12Q 1/6883 506/9 |

(Continued)

FOREIGN PATENT DOCUMENTS

| | | |
|---|---|---|
| CN | 1152153 A | 6/1997 |
| CN | 1480896 A | 3/2004 |

(Continued)

OTHER PUBLICATIONS

Partial supplementary European search report issued in corresponding European application No. 16893194.7 dated May 3, 2018.

(Continued)

*Primary Examiner* — Randolph I Chu
(74) *Attorney, Agent, or Firm* — Young Basile Hanlon & MacFarlane, P.C.

(57) ABSTRACT

A method for fingerprint identification and a terminal are provided. The method includes the follows. Source fingerprint data for fingerprint identification is acquired. Fingerprint data to be processed, whose fingerprint data value in a preset threshold range, is extracted from the source fingerprint data. A feature amplifying process is performed on the fingerprint data to be processed and the fingerprint data amplified is repaired to obtain repaired target fingerprint data. A three-dimensional surface is generated according to capacitance values of pixels of the target fingerprint data, a fingerprint image is simulated via the three-dimensional surface, and the simulated fingerprint image is compared with pre-stored fingerprint verification data. The source fingerprint data is determined to be identified successfully, based on a determination that the simulated fingerprint image matches the pre-stored fingerprint verification data.

9 Claims, 5 Drawing Sheets

(56) References Cited

U.S. PATENT DOCUMENTS

| | | | |
|---|---|---|---|
| 2014/0333328 A1 | 11/2014 | Nelson et al. | |
| 2015/0169932 A1 | 6/2015 | Riedijk et al. | |
| 2016/0350573 A1* | 12/2016 | Kitchens, II | G06K 9/0002 |
| 2018/0107853 A1* | 4/2018 | Zhou | G06K 9/00013 |

FOREIGN PATENT DOCUMENTS

| | | |
|---|---|---|
| CN | 1538345 A | 10/2004 |
| CN | 101499130 A | 8/2009 |
| CN | 101790165 A | 7/2010 |
| CN | 105094600 A | 11/2015 |
| CN | 105320918 A | 2/2016 |
| EP | 1530147 A1 | 5/2005 |

OTHER PUBLICATIONS

Nam et al: "Design and implementation of a capacitive fingerprint sensor circuit in CMOS technology", Sensors and Actuators A: Physical, Elsevier BV, NL, vol. 135, No. 1, Mar. 28, 2007, pp. 283-291.

Chin Kim On et al: "Fingerprint feature extraction based discrete cosine transformation (DCT)" Computing&Informatics, 2006. ICOCI '06, International Conference on, IEEE, Piscataway, NJ, USA, Jun. 6, 2006, pp. 1-5.

Ung-Keun Cho et al: "Evolutionary Singularity Filter Bank Optimization for Fingerprint Image Enhancement", Jan. 1, 2006, Applications of Evolutionary Computing Lecture Notes in Computer Science; pp. 380-390.

Hamid Ainul Azura et al: "Analysis of Proposed Noise Detection & Removal Technique in Degraded Fingerprint Images", vol. 6, No. 4, pp. 1-7.

\* cited by examiner

METHOD FOR FINGERPRINT IDENTIFICATION AND TERMINAL

CROSS-REFERENCE TO RELATED APPLICATION(S)

This application is a continuation of U.S. Ser. No. 15/846,236 filed on Dec. 19, 2017, which is a continuation of International Application No. PCT/CN2016/087778, filed on Jun. 29, 2016, which claims priority to Chinese Patent Application No. 201610137655.2, filed on Mar. 10, 2016, the contents of all of which are herein incorporated by reference in their entireties.

TECHNICAL FIELD

The present disclosure relates to the field of communications, and particularly to a method for fingerprint identification and a terminal.

BACKGROUND

At present, as technical development of mobile phones and other terminal devices is increasingly mature, fingerprint identification technology has become one standard configuration of flagships of mainstream terminal devices. The fingerprint identification technology can not only be configured for functions such as waking up or unlocking of a terminal, but also be one important part of mobile payment. In the fingerprint identification technology, a fingerprint identification process can include fingerprint feature data extraction, fingerprint feature data storing, fingerprint match, and other processes.

BRIEF DESCRIPTION OF THE DRAWINGS

To illustrate the technical solutions of implementations of the present disclosure more clearly, drawings used in the implementations will be briefly described below. Apparently, the drawings described in the following are merely some implementations of the present disclosure, and it will be apparent to those skilled in the art that other drawings can be obtained from the drawings without creative efforts.

DETAILED DESCRIPTION

Figure 1:
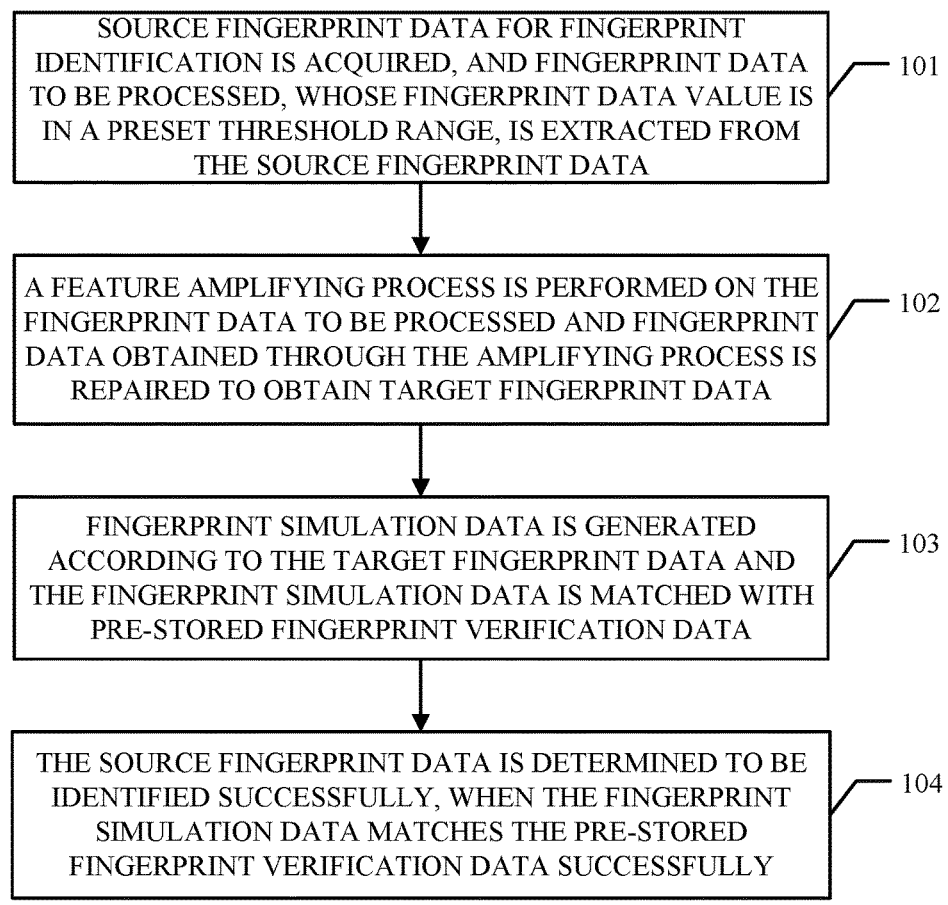
FIG. 1 is a schematic flowchart illustrating a fingerprint identification method according to an implementation of the present disclosure.

Technical solutions of the implementations of the present disclosure will be described below clearly and completely in conjunction with the accompanying drawings of the implementations of the present disclosure. Obviously, the described implementations are merely some rather than all of the implementations of the present disclosure. On the basis of the implementations of the present disclosure, all other implementations obtained by person skilled in the art without creative efforts shall fall within the protection scope of the present disclosure.

In specific implementations, a terminal referred to in the implementations of the present disclosure can include a mobile phone, a tablet computer, a personal digital assistant (PDA), a mobile Internet device (MID), an intelligent wearable device (such as an intelligent watch or an intelligent bracelet), and other devices. The present disclosure is not limited thereto. A method for fingerprint identification and a terminal provided in the implementations of the present disclosure will be described in detail by taking a mobile phone as an example.

Here is a brief description of terms or phrases used herein.

The term "source fingerprint data" refers to capacitance values of capacitors formed by points (including ridge points and valley points) of a fingerprint pattern and pixels of a fingerprint module (also known as fingerprint identification module, fingerprint identification sensor, fingerprint sensor, fingerprint recognizer, and the like).

The term "fingerprint verification data" refers to fingerprint image and other fingerprint data that the user registers and stores in a designated memory space of the mobile phone in advance. When a fingerprint function of a terminal device such as a mobile phone is enabled for the first time, the user may be asked to undergo a fingerprint registration process. During the fingerprint registration, the user may put his or her finger on a fingerprint module for fingerprint image acquisition, and the fingerprint image received or acquired will be stored as fingerprint verification data (also known as a registered fingerprint template). Generally, the fingerprint module may receive 10-20 times for each finger in order to receive the whole fingerprint surface and generate comprehensive fingerprint verification data. Characteristic information can be obtained from the fingerprint image received, and for example, the fingerprint verification data can be saved in the form of fingerprint image.

The term "unit" or "module" refers to one or more physical or logical components or elements of a system. In some implementations, a unit may be a distinct circuit, while in other implementations a unit may include a plurality of circuits.

It is to be understood that the terminology used in the implementations of the present disclosure is for the purpose of describing particular implementations only and is not intended to limit the disclosure. Unless the context clearly dictates otherwise, phrases such as "a/an", "the", "one" and the like used in the implementations of the disclosure and the appended claims are also intended to include a majority. It is also to be understood that the phrase "and/or" used herein refers to and encompasses any or all of the possible combinations of one or more associated listed items. For example, for the purpose of the present disclosure, the phrases "A and/or B" and "A or B" mean (A), (B), or (A and B).

In the related art, when fingerprint identification is performed, fingerprint feature data needs to be extracted first, the fingerprint feature data is processed preliminarily to obtain more legible fingerprint feature data, and then a feature point (also known as minutiae) matching is performed between the fingerprint feature data obtained and a pre-stored fingerprint template. When the fingerprint feature data obtained matches the pre-stored fingerprint template, the fingerprint identification is accomplished, and then waking up, unlocking, and other operations can be performed on the terminal.

In the related art, the fingerprint feature data is extracted to obtain a fingerprint image, and the fingerprint image is processed to obtain a more legible fingerprint image. Fingerprint features in the image are not processed. The manner of processing is simple. When fingerprint matching is performed, image matching between the fingerprint image and a fingerprint template image is performed for fingerprint identification. Since fingerprint data processing relates only to image processing and the fingerprint features are not processed, integrity of the fingerprint features obtained cannot be guaranteed, an error identification rate of fingerprint matching is large, and matching efficiency is low.

In order to improve accuracy, efficiency, and applicability of the fingerprint identification, and enhance user experience of the terminal, in implementations of the present disclosure, different from the related art, fingerprint features are processed. As one implementation, fingerprint data to be processed is extracted from fingerprint data. A feature amplifying process is then performed on the fingerprint data to be processed, and a repairing process is performed on the amplified fingerprint data, to obtain target fingerprint data. Based on the target fingerprint data, fingerprint simulation data will be generated to match with fingerprint verification data, and if match successful, a terminal will be unlocked.

FIG. 1 is a schematic flowchart illustrating a method for fingerprint identification according to an implementation of the present disclosure. The method described in the implementation of the present disclosure can begin at block 101.

At block 101, source fingerprint data for fingerprint identification is acquired, and fingerprint data to be processed, whose fingerprint data value is in a preset threshold range, is extracted from the source fingerprint data.

In some possible implementations, the fingerprint identification can include overall feature identification of fingerprints and local feature identification of fingerprints. Overall features of fingerprints refer to features that can be observed directly by human eyes, including basic ridge patterns such as loop ridges, arch ridges, whorl ridges, and the like. Local features of fingerprints refer to minutia features such as breakpoints, bifurcation points, turning points, and the like of a fingerprint pattern. The local features of fingerprints provide confirmation point characteristic of fingerprint uniqueness.

In some possible implementations, fingerprint data of a user finger can be acquired via a built-in fingerprint module. The fingerprint module includes a fingerprint chip. The fingerprint chip includes m*n queue-like pixels inside, where m and n are natural numbers. In specific implementations, when detecting that the user finger presses the fingerprint module (hereinafter, fingerprint module surface), the mobile phone can acquire capacitance values corresponding to each pixel in an image acquisition queue of the fingerprint module. The image acquisition queue refers to the above-mentioned pixel queue formed by m*n pixels. When the user finger presses the fingerprint module, a capacitor (can be regarded as a capacitance) is formed between the finger and each pixel. The capacitance value corresponding to each pixel changes due to difference between fingerprint ridge points and fingerprint valley points of the fingerprint pattern. The mobile phone can acquire capacitance values of each capacitor formed by each pixel and each fingerprint ridge point of the fingerprint pattern. The capacitor formed by one pixel and one fingerprint ridge point has one capacitance value. Since the fingerprint of the finger has multiple fingerprint ridge points and each fingerprint ridge point corresponds to a capacitance value, each capacitance value corresponding to each fingerprint ridge point can be set as a first capacitance value (hereinafter, the first capacitance value may refer to a set of first capacitance values, and each first capacitance value corresponds to a capacitor formed by a ridge point of the fingerprint pattern and a pixel of the fingerprint module). Further, the mobile phone can also acquire a capacitance value of each capacitor formed by each pixel and each fingerprint valley point of the fingerprint pattern. The capacitor formed between one pixel and one fingerprint valley point has one capacitance value. Since the finger fingerprint has multiple fingerprint valley points and each fingerprint valley point corresponds to a capacitance value, each capacitance value corresponding to each fingerprint valley point can be set as a second capacitance value (hereinafter, the second capacitance value may refer to a set of second capacitance values, and each second capacitance value corresponds to a capacitor formed by a valley point of the fingerprint pattern and a pixel of the fingerprint module).

In specific implementations, after the first capacitance value and the second capacitance value are acquired, they can be set as the source fingerprint data for forming a simulated fingerprint. Based on the source fingerprint data, fingerprint match and identification can be conducted. The form of the source fingerprint data can be the fingerprint pattern. Since fingerprint ridge points are closer to pixels of the fingerprint module than the fingerprint valley points, there will be a big difference between the first capacitance value (that is, capacitance values corresponding to each fingerprint ridge point) and the second capacitance value (capacitance values corresponding to each fingerprint valley point). When the fingerprint module of the mobile phone forms a simulated fingerprint on the basis of the first capacitance value and the second capacitance value, an uneven three-dimensional surface can be formed and further used to simulate a fingerprint image.

In some possible implementations, since bad pixels may appear in pixels in the image acquisition queue of the fingerprint module, the fingerprint is in poor contact with the fingerprint module, thereby causing abnormal data in the fingerprint data. In an implementation, based on each capacitance value of the source fingerprint data acquired, a threshold range of capacitance values can be set. The threshold range of the capacitance values may cover capacitances corresponding to more than 98% pixels. The mobile phone can extract, from the source fingerprint data, fingerprint data to be processed whose fingerprint data value is in the preset threshold range. The above-mentioned fingerprint data value can refer to capacitance values formed by the fingerprint and each pixel of the fingerprint module. In one implementation, the fingerprint data to be processed is the first capacitance value and the second capacitance value in the preset threshold range.

By extracting, from the source fingerprint, the fingerprint data to be processed, whose fingerprint data value is in a preset threshold range, the abnormal data can be removed, so as to reduce the workload of subsequent processing of the fingerprint data to be processed, and thereby improving efficiency of the fingerprint identification.

At block 102, a feature amplifying process is performed on the fingerprint data to be processed and fingerprint data obtained through the amplifying process is repaired to obtain target fingerprint data.

In some possible implementations, after extracting, from the source fingerprint data, the fingerprint data to be processed, whose fingerprint data value is in the preset threshold range, the fingerprint data to be processed can be subjected to the feature amplifying process, so as to amplify features of the fingerprint data and enhance fingerprint identification degree. Feature amplification of the fingerprint data may be an amplification of a fingerprint pattern.

There can be various manners to amplify features of the fingerprint pattern.

In one implementation, the fingerprint data to be processed can be multiplied by a designated coefficient, to obtain amplified fingerprint data.

Alternatively, in another one implementation, an amplification reference value can be determined and then subtracted from the fingerprint data to be processed, so as to obtain fingerprint data to be amplified; the fingerprint data to be amplified is multiplied by the designated coefficient, and then the amplification reference value is re-added to the fingerprint data after multiplying, to obtain the amplified fingerprint data.

In specific implementations, the fingerprint data to be processed can include a first capacitance value and a second capacitance value in the preset threshold range after being screened. The first capacitance value corresponds to the fingerprint ridge points and the second capacitance value corresponds to the fingerprint valley points. A median of the first capacitance value and the second capacitance value can be determined according to each capacitance value contained in the first capacitance value and the second capacitance value of the fingerprint data to be processed, in one implementation, 50 quartiles of each capacitance value of the fingerprint data to be processed. After the median of the first capacitance value and the second capacitance value are determined, the median can be set as the amplification reference value. The amplification reference value is configured to process the fingerprint data to be processed into a series of data fluctuating around the median, so as to enhance the difference of features.

In some possible implementations, after setting the above-mentioned amplification reference value, the mobile phone can subtract the amplification reference value from the fingerprint data to be processed to obtain fingerprint data to be amplified, and then amplify the fingerprint data to be amplified, thereby highlighting various fingerprint features. In one implementation, the mobile phone can multiply the fingerprint data to be amplified by the designated coefficient, and then add the amplification reference value to the fingerprint data after multiplying, to obtain the amplified fingerprint data. The designated coefficient is a magnification of the fingerprint feature and can be determined according to practical application scenes, and the present disclosure is not limited thereto. By re-adding the amplification reference value to the fingerprint data to be processed after amplifying to obtain the amplified fingerprint data, difference of features of the fingerprint data can be much larger than that of the fingerprint data before amplifying.

In the implementations of the present disclosure, the amplification reference value is subtracted from the fingerprint data to be processed before amplifying, to make the fingerprint ridge points and fingerprint valley points of the fingerprint pattern clearer. Transitional lines (pixel locations corresponding to the median of the capacitance values) between the fingerprint ridge points and fingerprint valley points of the fingerprint pattern become grey areas to enhance difference of the fingerprint pattern. When the fingerprint data to be processed is amplified directly, all of the fingerprint ridge points, fingerprint valley points, and the intermediate transitional lines are amplified, as a result, difference of features cannot be highlighted and clearer fingerprint data cannot be obtained.

In some possible implementations, when the finger presses the fingerprint module and there is dirt or other obstacle on the surface of the fingerprint module, blank areas will appear in the fingerprint pattern presented by the fingerprint data obtained through the fingerprint module. At this time, if the fingerprint data is not repaired, the fingerprint identification will fail. In one implementation, after obtaining the amplified fingerprint data, the mobile phone can detect fingerprint data of each pixel area and determine whether it is fingerprint data of normal pattern. Specifically, all pixels of the fingerprint module can be divided into multiple pixel areas, and each pixel area is a designated area. Each pixel area includes $x*y$ pixels, where $x$ and $y$ are natural numbers and can be set according to practical application scenes, and the present disclosure is not limited thereto. After dividing all the pixels into multiple pixel areas, a capacitance value of each pixel in each pixel area can be obtained. The capacitance value of each pixel includes a capacitance value corresponding to a fingerprint ridge point and a capacitance value corresponding to a fingerprint valley point. After obtaining capacitance values corresponding to the fingerprint ridge points and capacitance values corresponding to the fingerprint valley points in each pixel area, the difference between a capacitance value corresponding to a fingerprint ridge point and a capacitance value corresponding to a fingerprint valley point adjacent to the fingerprint ridge point can be determined. When the difference between capacitance values corresponding to fingerprint ridge points and capacitance values corresponding to fingerprint valley points in some pixel area are in a maximum theoretical difference range, it can be determined that the pixel area is a normal fingerprint area and there is no need to repair the fingerprint data. The above-mentioned maximum theoretical difference range can be determined through multiple experiments in advance, that is, the maximum difference range of the capacitance values corresponding to fingerprint ridge points and capacitance values corresponding to fingerprint valley points in a normal fingerprint pattern determined through multiple experiments. The present disclosure is not limited thereto.

For some pixel area, when any difference between a capacitance value corresponding to a fingerprint ridge point and a capacitance value corresponding to a fingerprint valley point adjacent to the fingerprint ridge point is greater than a preset difference threshold (that is, the above-mentioned maximum theoretical difference range), it can be determined that the above-mentioned pixel area is an abnormal area and the fingerprint data needs to be repaired. When repairing the fingerprint data in the abnormal area, the capacitance value corresponding to the fingerprint ridge point and the capacitance value corresponding to the fingerprint valley point can be deleted when the difference of these two capacitance values is larger than the preset difference threshold, and then set the median of capacitance values corresponding to pixels in the pixel area as the capacitance value corresponding to the fingerprint ridge point and the capacitance value corresponding to the fingerprint valley point, so as to fill the abnormal fingerprint area completely and obtain the target fingerprint data of a complete fingerprint pattern.

At block 103, fingerprint simulation data is generated according to the target fingerprint data, and then match the fingerprint simulation data with pre-stored fingerprint verification data.

In some possible implementations, after the target fingerprint data of a complete fingerprint pattern is obtained through amplifying and repairing, a three-dimensional surface can be generated according to capacitance values of pixels of the target fingerprint data. Since capacitance values of pixels are different, the three-dimensional surface generated according to the target fingerprint data will be an uneven three-dimensional surface, which can be used to simulate the fingerprint image.

After simulating the fingerprint image via the three-dimensional surface, the mobile phone can match the simulated fingerprint image with the pre-stored fingerprint verification data, to determine whether the simulated fingerprint image matches the fingerprint image presented by the fingerprint verification data. The pre-stored fingerprint verification data refers to fingerprint image and other fingerprint data that the user registers and stores in a designated memory space of the mobile phone in advance.

At block 104, the source fingerprint data is determined to be identified successfully, when the fingerprint simulation data matches the pre-stored fingerprint verification data successfully.

In some possible implementations, when determining that the simulated fingerprint image or other fingerprint simulation data matches a registered fingerprint image or other fingerprint verification data successfully, the fingerprint data identification can be determined successful and correspondingly, the mobile phone can be unlocked or waken up.

In the implementations of the present disclosure, source fingerprint data for fingerprint identification can be acquired, fingerprint data to be processed whose fingerprint data value is in a preset threshold range can be extracted from the source fingerprint data. Then, an amplifying process can be performed on the fingerprint data to be processed and a repairing process can be performed on the amplified fingerprint data, to obtain target fingerprint data. Further, fingerprint simulation image can be generated according to the target fingerprint data. The mobile phone can determine whether fingerprint identification is successful by matching the fingerprint simulation image with a registered fingerprint image or other fingerprint verification data. Correspondingly, functions of the mobile phone can be enabled when the fingerprint identification is successful.

In the implementations of the present disclosure, the amplifying process and the repairing process are performed on the fingerprint data to obtain more complete target fingerprint data, so as to reduce a workload of the follow-up amplifying process and repairing process on the fingerprint data, thereby reducing energy consumption of the fingerprint identification. Based on the target fingerprint data that has undergone the amplifying process and the repairing process, the mobile phone can generate the simulated fingerprint data, which can improve accuracy, efficiency, and applicability of the fingerprint identification, and user experience of a terminal can be enhanced.

Figure 2:
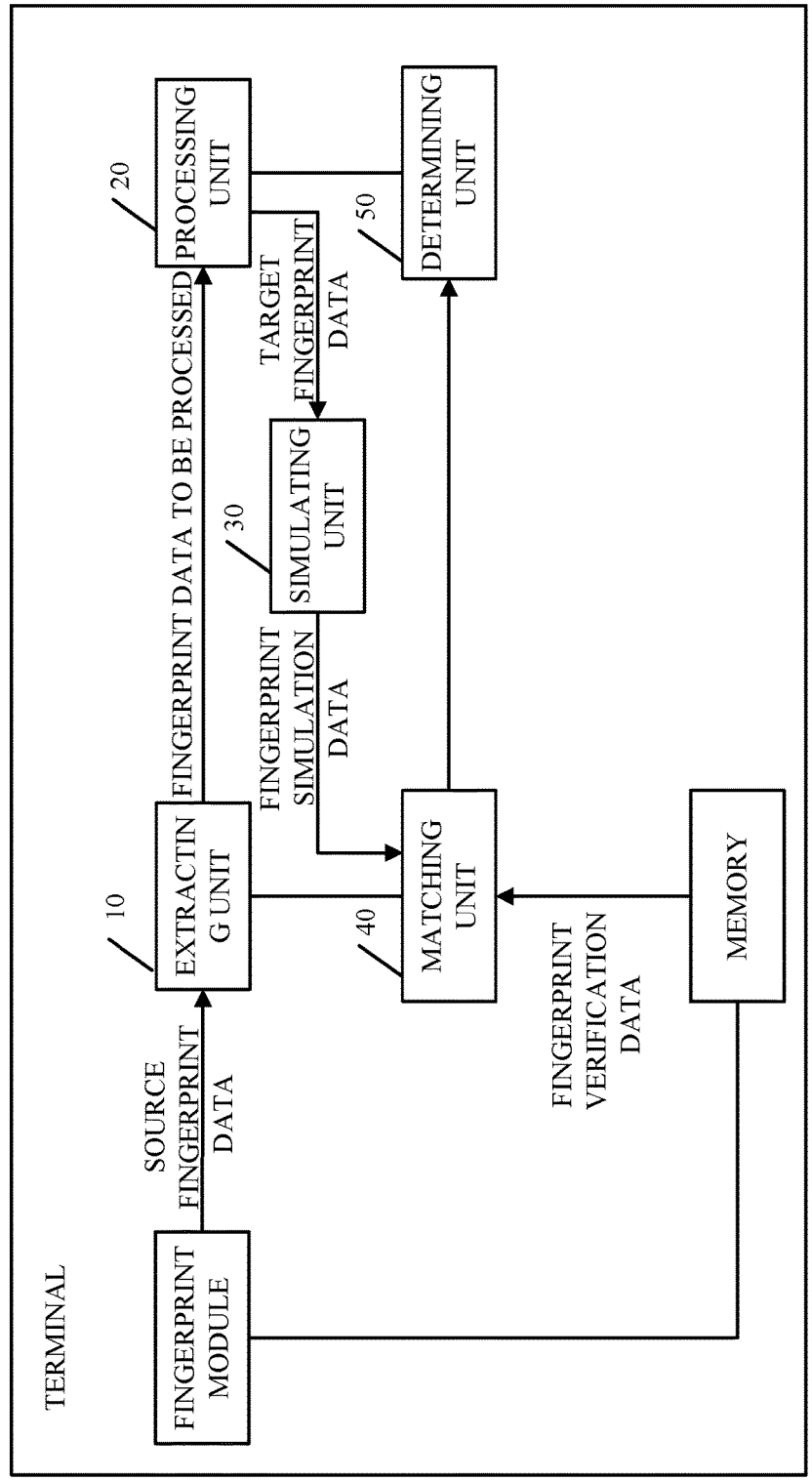
FIG. 2 is a structural schematic diagram illustrating a terminal according to an implementation of the present disclosure.

FIG. 2 is a structural schematic diagram illustrating a terminal according to an implementation of the present disclosure. The terminal described in the implementation of the present disclosure can include an extracting unit 10, a processing unit 20, a simulating unit 30, a comparing unit 40, and a determining unit 50.

The extracting unit 10 can be a reader or logic circuits or components coupled to or integrated in the processor. The processing unit 20 can be a processor, a circuit, control components coupled to or integrated in the processor, or a calculator. The simulating unit 30 can be a processor, a circuit, or a simulator. The comparing unit 40 can be a processor or a comparator. The determining unit 50 can be a processor, a circuit, or control components coupled to or integrated in the processor. The extracting unit 10, the processing unit 20, the simulating unit 30, the comparing unit 40, and the determining unit 50 can be disposed integrally or separately. Although these components are illustrated as separated from the fingerprint module, actually, they can be integrated into the fingerprint module, and the present disclosure is not particularly limited.

The extracting unit 10 is configured to acquire source fingerprint data for fingerprint identification and extract from the source fingerprint data fingerprint data to be processed, whose fingerprint data value is in a preset threshold range. The source fingerprint data can be acquired or received through a fingerprint module. The extracting unit 10 can be integrated with the fingerprint module. Or, the extracting unit 10 can be separated from the fingerprint module.

The processing unit 20 is configured to perform a feature amplifying process on the fingerprint data to be processed that is extracted (or acquired) by the extracting unit 10 and repair fingerprint data obtained through the amplifying process (that is, amplified fingerprint data) to obtain target fingerprint data.

The simulating unit 30 is configured to generate fingerprint simulation data (can be a fingerprint image for example) according to the target fingerprint data obtained by the processing unit 20.

The comparing unit 40 is configured to match the fingerprint simulation data with pre-stored fingerprint verification data.

The determining unit 50 is configured to determine that the source fingerprint data is identified successfully, when the fingerprint simulation data matches the pre-stored fingerprint verification data successfully.

For example, when a user puts his or her finger on the fingerprint module of the terminal to unlock the terminal, the extracting unit 10 will be first invoked to acquire source fingerprint data from the finger of the user, and then extract from the source fingerprint data fingerprint data to be processed. Thereafter, the processing unit 20 will be invoked to perform a feature amplifying process on the fingerprint data to be processed, and perform a repairing process on amplified fingerprint data, so as to obtain a target fingerprint data. After that, the simulating unit 30 will be invoked to generate fingerprint simulation data based on the target fingerprint data, and the fingerprint simulation data will be used to match pre-stored fingerprint verification data by the comparing unit 40. If the match is successful, the user can unlock the terminal. Otherwise, the unlock operation of the user will be denied.

In some possible implementation, the extracting unit 10 is further configured to: acquire a first capacitance value of a first capacitor and a second capacitance value of a second capacitor, when detecting that a finger is pressing a fingerprint module; set the first capacitance value and the second capacitance value as the source fingerprint data for forming a simulated fingerprint. The first capacitor (can be deemed as a capacitance) is formed by each pixel in an image acquisition queue of the fingerprint module and a fingerprint ridge point of the finger, and the second capacitor is formed by each pixel in the image acquisition queue of the fingerprint module and a fingerprint valley point of the finger.

In some possible implementations, the fingerprint data to be processed is the first capacitance value and the second capacitance value in the preset threshold range. The processing unit 20 is further configured to: acquire a median of the first capacitance value and the second capacitance value and set the median as an amplification reference value; subtract the amplification reference value from the fingerprint data to be processed to obtain fingerprint data to be amplified; multiply the fingerprint data to be amplified by a designated coefficient and then add the amplification reference value, to obtain fingerprint data after the amplifying process.

In some possible implementations, the processing unit 20 is further configured to: obtain, for each fingerprint ridge in a designated area of the fingerprint data after the amplifying process, the difference between a capacitance value corresponding to a fingerprint ridge point and a capacitance value corresponding to a fingerprint valley point adjacent to the fingerprint ridge point; substitute the capacitance value corresponding to the fingerprint ridge point and the capacitance value corresponding to the fingerprint valley point adjacent to the fingerprint ridge point with a median of capacitance values corresponding to pixels in the designated area, when the difference between the capacitance value corresponding to the fingerprint ridge point and the capacitance value corresponding to the fingerprint valley point adjacent to the fingerprint ridge point is greater than a difference threshold.

In some possible implementations, the simulating unit 30 is further configured to generate a three-dimensional surface according to capacitance values of pixels of the target fingerprint data and simulate a fingerprint image via the three-dimensional surface, to perform fingerprint matching via the simulated fingerprint image.

In some possible implementations, the fingerprint identification can include overall feature identification of fingerprints and local feature identification of fingerprints. Overall features of fingerprints refer to features that can be observed directly by human eyes, including basic ridge patterns such as loop ridges, arch ridges, whorl ridges, and the like. Local features of fingerprints refer to minutia features such as breakpoints, bifurcation points, turning points, and the like of a fingerprint pattern. The local features of fingerprints provide confirmation point characteristic of fingerprint uniqueness.

In some possible implementations, the exacting unit 10 of a mobile phone can acquire fingerprint data of a user finger via a built-in fingerprint module. The fingerprint module includes a fingerprint chip. The fingerprint chip includes m*n queue-like pixels inside, where m and n are natural numbers. In specific implementations, when detecting that the user finger presses the fingerprint module (to be specific, a surface of the fingerprint module), the exacting unit 10 can acquire capacitance values corresponding to each pixel in an image acquisition queue of the fingerprint module. The image acquisition queue refers to the above-mentioned pixel queue formed by m*n pixels. When the user finger presses the fingerprint module, a capacitor (can be deemed as a capacitance) is formed between the finger and each pixel. The capacitance value corresponding to each pixel varies due to the difference between fingerprint ridge points and fingerprint valley points of the fingerprint pattern. The exacting unit 10 can acquire capacitance values of each capacitor formed by each pixel and each fingerprint ridge point of the fingerprint pattern. The capacitor formed by one pixel and one fingerprint ridge point has one capacitance value. Since the fingerprint of the finger has multiple fingerprint ridge points and each fingerprint ridge point corresponds to a capacitance value, the exacting unit 10 can set each capacitance value corresponding to each fingerprint ridge point as a first capacitance value. Further, the exacting unit 10 can also acquire a capacitance value of each capacitor formed by each pixel and each fingerprint valley point of the fingerprint pattern, the capacitor formed by one pixel and one fingerprint valley point has one capacitance value. Since the finger fingerprint has multiple fingerprint valley points and each fingerprint valley point corresponds to a capacitance value, the exacting unit 10 can set each capacitance value corresponding to each fingerprint valley point as a second capacitance value.

In specific implementations, after acquiring the first capacitance value and the second capacitance value, the exacting unit 10 can set the first capacitance value and the second capacitance value as the source fingerprint data for forming a simulated fingerprint. Based on the source fingerprint data, fingerprint match and identification can be conducted. The form of the source fingerprint data can be the fingerprint pattern. Since fingerprint ridge points are closer to pixels of the fingerprint module than the fingerprint valley points, there will be a big difference between the first capacitance value (that is, capacitance values corresponding to each fingerprint ridge point) and the second capacitance value (capacitance values corresponding to each fingerprint valley point). When the fingerprint module of the mobile phone generates a simulated fingerprint on the basis of the first capacitance value and the second capacitance value, an uneven three-dimensional surface can be generated and further used to simulate a fingerprint image.

In some possible implementations, since bad pixels may appear in pixels in the image acquisition queue of the fingerprint module, the fingerprint is in a poor contact with the fingerprint module, thereby causing abnormal data in the fingerprint data. In an implementation, based on each capacitance value of the source fingerprint data acquired, the exacting unit 10 can set a threshold range of the capacitance values. The threshold range of the capacitance values may cover more than 98% pixels. The exacting unit 10 can extract, from the source fingerprint data, fingerprint data to be processed, whose fingerprint data value is in the preset threshold range. The above-mentioned fingerprint data value can refer to capacitance values formed by the fingerprint and each pixel of the fingerprint module. By extracting, from the source fingerprint, the fingerprint data to be processed, whose fingerprint data value is in a preset threshold range, the abnormal data can be removed, so as to reduce the workload of subsequent processing of the fingerprint data to be processed, and thereby improving the efficiency of the fingerprint identification.

In some possible implementations, after the extracting unit 10 extracts, from the source fingerprint data, the fingerprint data to be processed, whose fingerprint data value is in the preset threshold range, the processing unit 20 can perform the feature amplifying process on the fingerprint data to be processed so as to amplify features of the fingerprint data and enhance fingerprint identification degree. Feature amplification of the fingerprint data may be an amplification of a fingerprint pattern. In some implementations, the fingerprint data to be processed can include a first capacitance value and a second capacitance value in the preset threshold range after being screened. The first capacitance value corresponds to the fingerprint ridge points and the second capacitance value corresponds to the fingerprint valley points. The processing unit 20 can determine a median of the first capacitance value and the second capacitance value according to each capacitance value contained in the first capacitance value and the second capacitance value of the fingerprint data to be processed, that is, 50 quartiles of each capacitance value of the fingerprint data to be processed. After determining the median of the first capacitance value and the second capacitance value, the processing unit 20 can set the median as an amplification reference value. The amplification reference value is configured to process the fingerprint data to be processed into a series of data fluctuating around the median, so as to enhance the difference of features.

In some possible implementations, after setting the above-mentioned amplification reference value, the processing unit 20 can subtract the amplification reference value from the fingerprint data to be processed to obtain fingerprint data to be amplified, and then amplify the fingerprint data to be amplified, thereby highlighting various fingerprint features. In one implementation, the processing unit 20 can multiply the fingerprint data to be amplified by a designated coefficient, and then add the amplification reference value to the fingerprint data after multiplying, to obtain amplified fingerprint data. The designated coefficient is a magnification of the fingerprint feature and can be determined according to practical application scenes, and the present disclosure is not limited thereto. The processing unit 20 re-adds the amplification reference value to the fingerprint data to be processed after amplifying, to obtain the amplified fingerprint data, a difference of features of the fingerprint data can be much larger than that of the fingerprint data before amplifying.

In the implementations of the present disclosure, before magnifying, the processing unit 20 subtracts the amplification reference value from the fingerprint data to be processed, to make the fingerprint ridge points and fingerprint valley points of the fingerprint pattern clearer. Transitional lines (pixel locations corresponding to the median of the capacitance values) between the fingerprint ridge points and fingerprint valley points of the fingerprint pattern become grey areas to enhance differentiation in the fingerprint pattern. When the processing unit 20 magnifies the fingerprint data to be processed directly, all of the fingerprint ridge points, fingerprint valley points, and the middle transitional lines are amplified, as a result, a difference of features cannot be highlighted and clearer fingerprint data cannot be obtained.

In some possible implementations, when the finger presses the fingerprint module and there is dirt or another obstacle on the surface of the fingerprint module, blank areas will appear in the fingerprint pattern presented by the fingerprint data obtained through the fingerprint module by the extracting unit 10. At this time, if the fingerprint data is not repaired, the fingerprint identification will fail. In specific implementations, after obtaining the amplified fingerprint data, the processing unit 20 can detect fingerprint data of each pixel area and determine whether it is fingerprint data of normal pattern. Specifically, the processing unit 20 can divide all pixels of the fingerprint module into multiple pixel areas, and each pixel area is a designated area. Each pixel area includes x*y pixels, where x and y are natural numbers and can be set according to practical application scenes, and the present disclosure is not limited thereto. After dividing all the pixels into multiple pixel areas, the processing unit 20 can obtain a capacitance value of each pixel in each pixel area. The capacitance value of each pixel includes a capacitance value corresponding to a fingerprint ridge point and a capacitance value corresponding to a fingerprint valley point. After obtaining capacitance values corresponding to the fingerprint ridge points and capacitance values corresponding to the fingerprint valley points in each pixel area, the processing unit 20 can determine the difference between a capacitance value corresponding to a fingerprint ridge point and a capacitance value corresponding to a fingerprint valley point adjacent to the fingerprint ridge point. When the difference between capacitance values corresponding to fingerprint ridge points and capacitance values corresponding to fingerprint valley points in some pixel area is in a maximum theoretical difference range, it can be determined that the pixel area is a normal fingerprint area and there is no need to repair the fingerprint data. The above-mentioned maximum theoretical difference range can be determined through multiple experiments in advance, that is, the maximum difference range of the capacitance values corresponding to fingerprint ridge points and capacitance values corresponding to fingerprint valley points in a normal fingerprint pattern determined through multiple experiments. The present disclosure is not limited thereto.

For some pixel areas, when the processing unit 20 determines that any difference between a capacitance value corresponding to a fingerprint ridge point and a capacitance value corresponding to a fingerprint valley point adjacent to the fingerprint ridge point is greater than a preset difference threshold (that is, the above-mentioned maximum theoretical difference range), the processing unit 20 can determine that the above-mentioned pixel area is an abnormal area and the fingerprint data needs to be repaired. When repairing the fingerprint data in the abnormal area, the processing unit 20 can delete the capacitance value corresponding to the fingerprint ridge point and the capacitance value corresponding to the fingerprint valley point when the difference between these two capacitance values is larger than the preset difference threshold, and then set the median of capacitance values corresponding to pixels in the pixel area as the capacitance value corresponding to the fingerprint ridge point and the capacitance value corresponding to the fingerprint valley, so as to fill the abnormal fingerprint area completely and obtain the target fingerprint data of a complete fingerprint pattern.

In some possible implementations, after the processing unit 20 obtains the target fingerprint data of a complete fingerprint pattern through amplifying and repairing, the comparing unit 40 can generate a three-dimensional surface according to capacitance values of pixels of the target fingerprint data. Since capacitance values of pixels are different, the three-dimensional surface generated according to the target fingerprint data will be an uneven three-dimensional surface, which can be used to simulate the fingerprint image. After simulating the fingerprint image via the three-dimensional surface, the comparing unit 40 can match the simulated fingerprint image with the pre-stored fingerprint verification data, to determine whether the simulated fingerprint image matches the fingerprint image presented by the fingerprint verification data. The pre-stored fingerprint verification data refers to fingerprint image and other fingerprint data that the user registers and stores in a designated memory space of the mobile phone in advance.

In some possible implementations, when the comparing unit 40 determines that the simulated fingerprint image or other fingerprint simulation data matches a registered fingerprint image or other fingerprint verification data successfully, the determining unit 50 can determine that fingerprint data identification is successful and correspondingly, the mobile phone can be unlocked or waken up.

In the implementations of the present disclosure, source fingerprint data for fingerprint identification can be acquired, fingerprint data to be processed whose fingerprint data value is in a preset threshold range can be extracted from the source fingerprint data. Then, an amplifying process can be performed on the fingerprint data to be processed and a repairing process can be performed on the amplified fingerprint data, to obtain target fingerprint data. Further, fingerprint simulation image can be generated according to the target fingerprint data. The mobile phone can determine whether fingerprint identification is successful by comparing the fingerprint simulation image with a registered fingerprint image or other fingerprint verification data. Correspondingly, functions of the mobile phone can be enabled when the fingerprint identification is successful. In the implementations of the present disclosure, the amplifying process and the repairing process are performed on the fingerprint data to obtain more complete target fingerprint data, so as to reduce a workload of the follow-up amplifying process and repairing process on the fingerprint data, thereby reducing the energy consumption of the fingerprint identification. Based on the target fingerprint data that has undergone the amplifying process and the repairing process, the mobile phone can generate the simulated fingerprint data, which can improve accuracy, efficiency, and applicability of the fingerprint identification, and user experience of a terminal can be enhanced.

Figure 3:
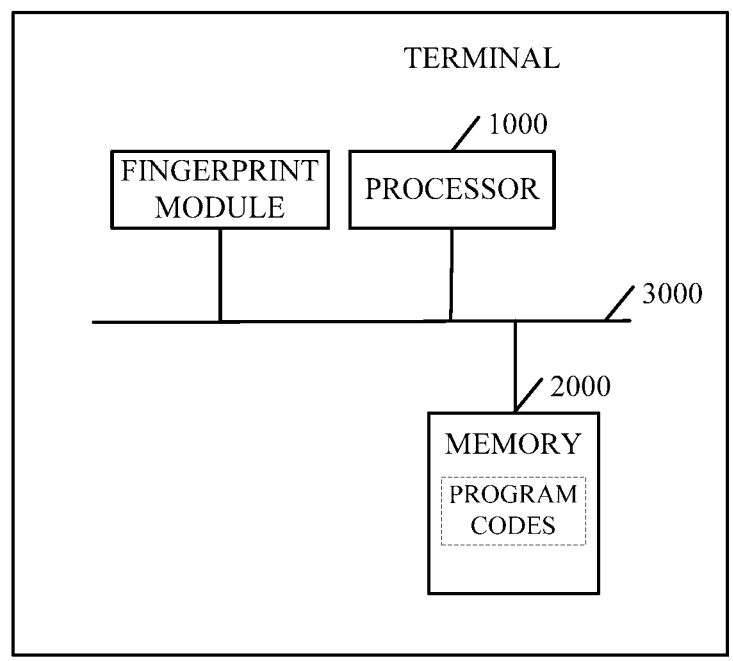
FIG. 3 is a structural schematic diagram illustrating another terminal according to an implementation of the present disclosure.

FIG. 3 is a structural schematic diagram illustrating another terminal according to an implementation of the present disclosure. The terminal described in the implementation of the present disclosure can include a processor 1000 and a memory 2000. The processor 1000 and the memory 2000 are connected via a bus 3000.

The memory 2000 can be a high-speed RAM memory, or a non-volatile memory, such as a disk memory.

The memory 2000 is configured to store a set of executable program codes and the processor 1000 is configured to invoke the executable program codes stored in the memory 2000 to perform operations of any method described in the implementations of the disclosure.

In one implementation, the processor 1000 is configured to invoke the executable program codes stored in the memory 2000 to: acquire source fingerprint data for fingerprint identification and extract, from the source fingerprint data, fingerprint data to be processed, whose fingerprint data to be processed has a fingerprint data value in a preset threshold range; perform a feature amplifying process on the fingerprint data to be processed and repair fingerprint data obtained through the amplifying process to obtain target fingerprint data; generate fingerprint simulation data according to the target fingerprint data and compare the fingerprint simulation data with pre-stored fingerprint verification data; determine that the source fingerprint data is identified successfully, when the fingerprint simulation data matches the pre-stored fingerprint verification data successfully.

In some possible implementations, the processor 1000 is further configured to: acquire a first capacitance value of a first capacitor and a second capacitance value of a second capacitor, when detecting that a finger is pressing a fingerprint module, where the first capacitor is formed by each pixel in an image acquisition queue of the fingerprint module and a fingerprint ridge point of the finger, and the second capacitor is formed by each pixel in the image acquisition queue of the fingerprint module and a fingerprint valley point of the finger; set the first capacitance value and the second capacitance value as the source fingerprint data for forming a simulated fingerprint.

In some possible implementations, the fingerprint data to be processed is the first capacitance value and the second capacitance value in the preset threshold range.

The processor 1000 is further configured to: acquire a median of the first capacitance value and the second capacitance value and set the median as an amplification reference value; subtract the amplification reference value from the fingerprint data to be processed to obtain fingerprint data to be amplified; multiply the fingerprint data to be amplified by a designated coefficient and then add the amplification reference value, to obtain fingerprint data after the amplifying process.

In some possible implementations, the processor 1000 is further configured to: obtain, for each fingerprint pattern in a designated area of the fingerprint data after the amplifying process, the difference between a capacitance value corresponding to a fingerprint ridge point and a capacitance value corresponding to a fingerprint valley point adjacent to the fingerprint ridge point; substitute the capacitance value corresponding to the fingerprint ridge point and the capacitance value corresponding to the fingerprint valley point adjacent to the fingerprint ridge point with a median of capacitance values corresponding to pixels in the designated area, when the difference between the capacitance value corresponding to the fingerprint ridge point and the capacitance value corresponding to the fingerprint valley point adjacent to the fingerprint ridge point is greater than a difference threshold.

In some possible implementations, the processor 1000 is further configured to: generate a three-dimensional surface according to capacitance values of pixels of the target fingerprint data and simulate a fingerprint image via the three-dimensional surface, to perform the comparison via the simulated fingerprint image.

In some possible implementations, with aid of built-in components (for example, memory 2000, processor 1000, and the like), the terminal described in the implementations of the present disclosure can achieve implementations described in the implementations of the method for fingerprint identification, and can also achieve implementations described in the implementations of the terminal. Specific implementation can be referred to the above-mentioned implementations, and will not be repeated here.

Figure 4:
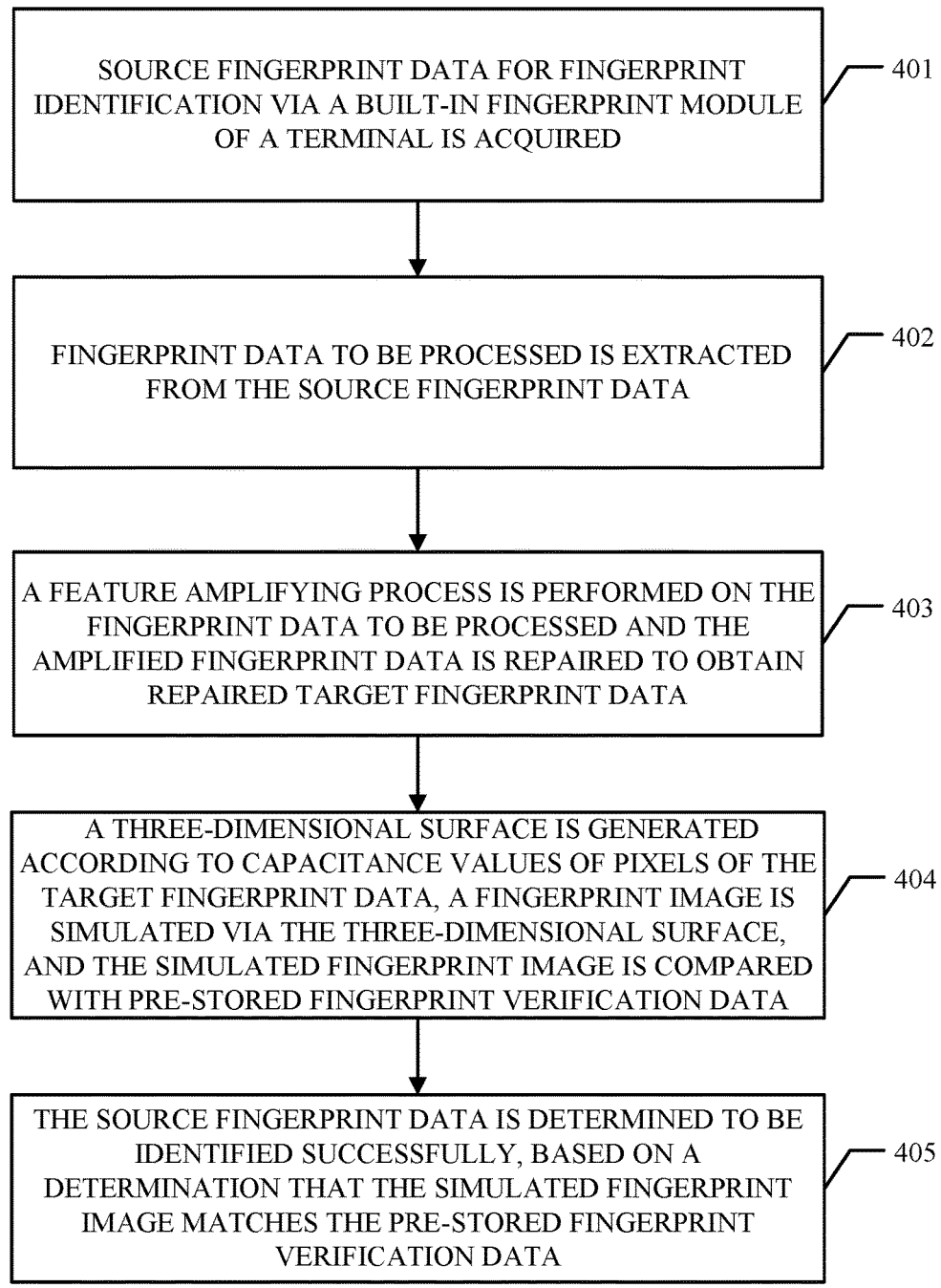
FIG. 4 is a schematic flowchart illustrating a method for fingerprint identification according to an implementation of the present disclosure.

FIG. 4 is a schematic flowchart illustrating a method for fingerprint identification according to an implementation of the present disclosure. As illustrated in FIG. 4, the method begins at block 401.

At block 401, source fingerprint data for fingerprint identification is acquired via a built-in fingerprint module of a terminal, where the source fingerprint data includes: capacitance values formed by each pixel in an image acquisition queue on a surface of the fingerprint module and each fingerprint ridge point of a fingerprint pattern, and capacitance values formed by each pixel and each fingerprint valley point of the fingerprint pattern.

At block 402, fingerprint data to be processed is extracted from the source fingerprint data, where the fingerprint data to be processed has a fingerprint data value in a preset threshold range and includes a first capacitance value corresponding to fingerprint ridge points and a second capacitance value corresponding to fingerprint valley points.

At block 403, a feature amplifying process is performed on the fingerprint data to be processed and the amplified fingerprint data is repaired to obtain repaired target fingerprint data.

At block 404, a three-dimensional surface is generated according to capacitance values of pixels of the target fingerprint data, a fingerprint image is simulated via the three-dimensional surface, and the simulated fingerprint image is compared with pre-stored fingerprint verification data.

At block 405, the source fingerprint data is determined to be identified successfully, based on a determination that the simulated fingerprint image matches the pre-stored fingerprint verification data.

In one implementation, the amplified fingerprint data includes fingerprint data of the fingerprint peak points corresponding to amplified first capacitance value and fingerprint data of the fingerprint valley points corresponding to amplified second capacitance value.

In one implementation, a feature amplifying process is performed on the fingerprint data to be processed as follows. A median of all values of the first capacitance value and the second capacitance value is acquired and the median is set as an amplification reference value. The amplification reference value is subtracted from the first capacitance value corresponding to the fingerprint peak points to obtain fingerprint peak points data to be amplified, and the fingerprint peak points data to be amplified is multiplied by a designated coefficient and then the amplification reference value is added, to obtain the amplified fingerprint peak points data. The amplification reference value is subtracted from the second capacitance value corresponding to the fingerprint valley points to obtain fingerprint valley points data to be amplified, and the fingerprint valley points data to be amplified is multiplied by a designated coefficient and then the amplification reference value is added, to obtain the amplified fingerprint valley points data.

In one implementation, the source fingerprint data for fingerprint identification is acquired as follows. A first capacitance value of capacitance formed by each pixel in the image acquisition queue of the surface of the fingerprint module and a fingerprint ridge point of the finger, and a second capacitance value of capacitance formed by each pixel in the image acquisition queue of the surface of the fingerprint module and a fingerprint valley point of the finger are acquired, when detecting that a finger is pressing the surface of the fingerprint module. The first capacitance value and the second capacitance value are set as the source fingerprint data for forming a simulated fingerprint.

In one implementation, the amplified fingerprint data is repaired as follows. All pixels of the fingerprint module are divided into multiple pixel areas, each pixel area being a designated area and including x*y pixels, where x and y are natural numbers. For each fingerprint pattern in a designated area of the amplified fingerprint data, a difference between a capacitance value corresponding to a fingerprint ridge point and a capacitance value corresponding to a fingerprint valley point adjacent to the fingerprint ridge point is obtained. The designated area is determined as an abnormal area when the difference between the capacitance value corresponding to the fingerprint ridge point and the capacitance value corresponding to the fingerprint valley point adjacent to the fingerprint ridge point is greater than a preset difference threshold. The capacitance value corresponding to the fingerprint ridge point and the capacitance value corresponding to the fingerprint valley point adjacent to the fingerprint ridge point are replaced with a median of capacitance values corresponding to pixels in the abnormal area, when the difference between the capacitance value corresponding to the fingerprint ridge point and the capacitance value corresponding to the fingerprint valley point adjacent to the fingerprint ridge point is greater than the difference threshold, to fill the abnormal fingerprint area completely to repair the amplified fingerprint data.

Figure 5:
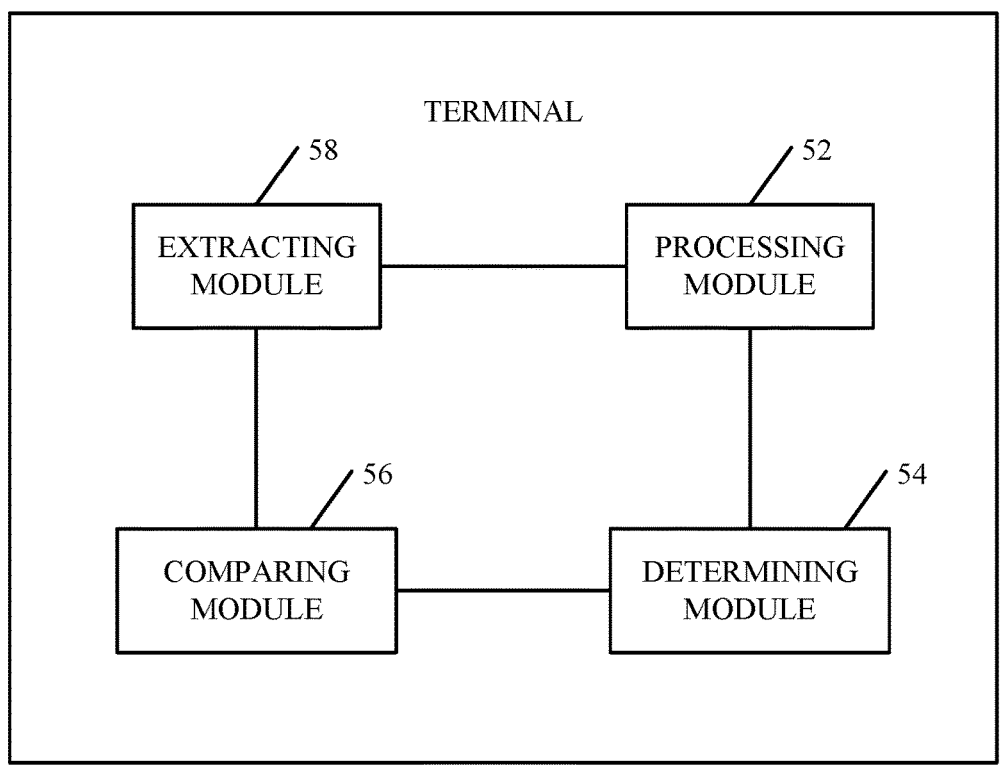
FIG. 5 is a structural schematic diagram illustrating a terminal according to an implementation of the present disclosure.

FIG. 5 is a structural schematic diagram illustrating a terminal according to an implementation of the present disclosure. As illustrated in FIG. 5, the terminal includes a processing module 52, a determining module 54, a comparing module 56, and an extracting module 58. The above components can be integrated into a fingerprint sensor for example. Alternatively, the processing module 52 can be a micro-controller independent from and connected with the fingerprint sensor.

The extracting module 58 is configured to acquire source fingerprint data for fingerprint identification via a built-in fingerprint module of a terminal, where the source fingerprint data includes: capacitance values formed by each pixel in an image acquisition queue on a surface of the fingerprint module and each fingerprint ridge point of a fingerprint pattern, and capacitance values formed by each pixel and each fingerprint valley point of the fingerprint pattern.

In one implementation, the extracting module 58 is further configured to extract, from the source fingerprint data, fingerprint data to be processed, where the fingerprint data to be processed has a fingerprint data value in a preset threshold range and includes a first capacitance value corresponding to fingerprint ridge points and a second capacitance value corresponding to fingerprint valley points.

The processing module 52 is configured to perform a feature amplifying process on the fingerprint data to be processed extracted by the extracting module 58 and repair the amplified fingerprint data to obtain repaired target fingerprint data.

The comparing module 56 is configured to generate a three-dimensional surface according to capacitance values of pixels of the target fingerprint data, simulate a fingerprint image via the three-dimensional surface, and compare the simulated fingerprint image with pre-stored fingerprint verification data.

The determining module 54 is configured to determine that the source fingerprint data is identified successfully, based on a determination that the simulated fingerprint image matches the pre-stored fingerprint verification data.

In one implementation, the amplified fingerprint data includes fingerprint data of the fingerprint peak points corresponding to amplified first capacitance value and fingerprint data of the fingerprint valley points corresponding to amplified second capacitance value.

In one implementation, the processing module 52 configured to perform the feature amplifying process on the fingerprint data to be processed is configured to: acquire a median of all values of the first capacitance value and the second capacitance value and set the median as an amplification reference value; subtract the amplification reference value from the first capacitance value corresponding to the fingerprint peak points to obtain fingerprint peak points data to be amplified, and multiply the fingerprint peak points data to be amplified by a designated coefficient and then add the amplification reference value, to obtain the amplified fingerprint peak points data; subtract the amplification reference value from the second capacitance value corresponding to the fingerprint valley points to obtain fingerprint valley points data to be amplified, and multiply the fingerprint valley points data to be amplified by a designated coefficient and then add the amplification reference value, to obtain the amplified fingerprint valley points data.

In one implementation, the extracting module 58 configured to acquire the source fingerprint data for fingerprint identification is configured to: acquire a first capacitance value of capacitance formed by each pixel in the image acquisition queue of the surface of the fingerprint module and a fingerprint ridge point of the finger, and a second capacitance value of capacitance formed by each pixel in the image acquisition queue of the surface of the fingerprint module and a fingerprint valley point of the finger, when detecting that a finger is pressing the surface of the fingerprint module; set the first capacitance value and the second capacitance value as the source fingerprint data for forming a simulated fingerprint.

In one implementation, the processing module 52 is configured to repair the amplified fingerprint data is configured to: divide all pixels of the fingerprint module into multiple pixel areas, each pixel area being a designated area and comprising x*y pixels, where x and y are natural numbers; for each fingerprint pattern in a designated area of the amplified fingerprint data, obtain a difference between a capacitance value corresponding to a fingerprint ridge point and a capacitance value corresponding to a fingerprint valley point adjacent to the fingerprint ridge point; determine the designated area as an abnormal area when the difference between the capacitance value corresponding to the fingerprint ridge point and the capacitance value corresponding to the fingerprint valley point adjacent to the fingerprint ridge point is greater than a preset difference threshold; replace the capacitance value corresponding to the fingerprint ridge point and the capacitance value corresponding to the fingerprint valley point adjacent to the fingerprint ridge point with a median of capacitance values corresponding to pixels in the abnormal area, when the difference between the capacitance value corresponding to the fingerprint ridge point and the capacitance value corresponding to the fingerprint valley point adjacent to the fingerprint ridge point is greater than the difference threshold, to fill the abnormal fingerprint area completely to repair the amplified fingerprint data.

The implementations of the present disclosure also provide a computer storage medium. The computer storage medium may store a program(s), and the program is configured to execute some or all of the steps of any method for fingerprint identification in the method implementation when invoked.

It will be understood by those of ordinary skill in the art that, implementation of all or part of the processes in the method of the implementations described above can be accomplished by a computer program to instruct the associated hardware; the computer program can be stored in a computer-readable storage medium. The storage medium can be a flash disk, a read-only memory (ROM), a random access memory (RAM), a magnetic disk, an optical disk, or the like.

The foregoing disclosed is merely exemplary implementations and it is not intended to limit the scope of the present disclosure; equivalents changes made on the basis of the claims of the present disclosure shall fall into the scope of the present disclosure.

What is claimed is:

1. A method for fingerprint identification, comprising:
  acquiring source fingerprint data for fingerprint identification via a built-in fingerprint sensor of a terminal, wherein the source fingerprint data comprises: capacitance values formed by each pixel in an image acquisition queue on a surface of the fingerprint sensor and each fingerprint ridge point of a fingerprint pattern, and capacitance values formed by each pixel and each fingerprint valley point of the fingerprint pattern;
  extracting, from the source fingerprint data, fingerprint data to be processed, wherein the fingerprint data to be processed has a fingerprint data value in a preset threshold range and comprises a first capacitance value corresponding to fingerprint ridge points and a second capacitance value corresponding to fingerprint valley points;
  performing a feature amplifying process on the fingerprint data to be processed and repairing the amplified fingerprint data to obtain repaired target fingerprint data;
  generating a three-dimensional surface according to capacitance values of pixels of the target fingerprint data, simulating a fingerprint image via the three-dimensional surface, comparing the simulated fingerprint image with pre-stored fingerprint verification data; and
  determining that the source fingerprint data is identified successfully, based on a determination that the simulated fingerprint image matches the pre-stored fingerprint verification data; and
  determining that the fingerprint identification is successful based on a determination that the source fingerprint data is identified successfully, and controlling a screen-operation of the terminal based on a determination that the fingerprint identification is successful,
  wherein the amplified fingerprint data comprises fingerprint data of fingerprint peak points corresponding to amplified first capacitance value and fingerprint data of the fingerprint valley points corresponding to amplified second capacitance value;
  wherein the performing a feature amplifying process on the fingerprint data to be processed comprises:
    acquiring a median of all values of the first capacitance value and the second capacitance value and setting the median as an amplification reference value;
    subtracting the amplification reference value from the first capacitance value corresponding to the fingerprint peak points to obtain fingerprint peak points data to be amplified, and multiplying the fingerprint peak points data to be amplified by a designated coefficient and then adding the amplification reference value, to obtain amplified fingerprint peak points data; and
    subtracting the amplification reference value from the second capacitance value corresponding to the fingerprint valley points to obtain fingerprint valley points data to be amplified, and multiplying the fingerprint valley points data to be amplified by a designated coefficient and then adding the amplification reference value, to obtain amplified fingerprint valley points data.

2. The method of claim 1, wherein acquiring the source fingerprint data for fingerprint identification comprises:
  acquiring a first capacitance value of capacitance formed by each pixel in the image acquisition queue of the surface of the fingerprint sensor and a fingerprint ridge point of a finger, and a second capacitance value of capacitance formed by each pixel in the image acquisition queue of the surface of the fingerprint sensor and a fingerprint valley point of the finger, when detecting that the finger is pressing the surface of the fingerprint sensor; and
  setting the first capacitance value and the second capacitance value as the source fingerprint data for forming a simulated fingerprint.

3. The method of claim 2, wherein repairing the amplified fingerprint data comprises:
  dividing all pixels of the fingerprint sensor into multiple pixel areas, each pixel area being a designated area and comprising x*y pixels, wherein x and y are natural numbers;
  for each fingerprint pattern in a designated area of the amplified fingerprint data, obtaining a difference between a capacitance value corresponding to a fingerprint ridge point and a capacitance value corresponding to a fingerprint valley point adjacent to the fingerprint ridge point;

determining the designated area as an abnormal area when the difference between the capacitance value corresponding to the fingerprint ridge point and the capacitance value corresponding to the fingerprint valley point adjacent to the fingerprint ridge point is greater than a preset difference threshold; and replacing the capacitance value corresponding to the fingerprint ridge point and the capacitance value corresponding to the fingerprint valley point adjacent to the fingerprint ridge point with a median of capacitance values corresponding to pixels in the abnormal area, when the difference between the capacitance value corresponding to the fingerprint ridge point and the capacitance value corresponding to the fingerprint valley point adjacent to the fingerprint ridge point is greater than the difference threshold, to fill an abnormal fingerprint area completely to repair the amplified fingerprint data.

4. A terminal, comprising:

an extracting module, configured to acquire source fingerprint data for fingerprint identification via a built-in fingerprint sensor of a terminal, wherein the source fingerprint data comprises: capacitance values formed by each pixel in an image acquisition queue on a surface of the fingerprint sensor and each fingerprint ridge point of a fingerprint pattern, and capacitance values formed by each pixel and each fingerprint valley point of the fingerprint pattern;

the extracting module being further configured to extract, from the source fingerprint data, fingerprint data to be processed, wherein the fingerprint data to be processed has a fingerprint data value in a preset threshold range and comprises a first capacitance value corresponding to fingerprint ridge points and a second capacitance value corresponding to fingerprint valley points;

a processing module, configured to perform a feature amplifying process on the fingerprint data to be processed extracted by the extracting module and repair the amplified fingerprint data to obtain repaired target fingerprint data;

a comparing module, configured to generate a three-dimensional surface according to capacitance values of pixels of the target fingerprint data, simulate a fingerprint image via the three-dimensional surface, and compare the simulated fingerprint image with pre-stored fingerprint verification data; and a determining module, configured to determine that the source fingerprint data is identified successfully, based on a determination that the simulated fingerprint image matches the pre-stored fingerprint verification data, to determine that the fingerprint identification is successful based on a determination that the source fingerprint data is identified successfully, and to control a screen-operation of the terminal based on a determination that the fingerprint identification is successful;

wherein the amplified fingerprint data comprises fingerprint data of fingerprint peak points corresponding to amplified first capacitance value and fingerprint data of the fingerprint valley points corresponding to amplified second capacitance value;

wherein the processing module configured to perform the feature amplifying process on the fingerprint data to be processed is configured to:

acquire a median of all values of the first capacitance value and the second capacitance value and set the median as an amplification reference value;

subtract the amplification reference value from the first capacitance value corresponding to the fingerprint peak points to obtain fingerprint peak points data to be amplified, and multiply the fingerprint peak points data to be amplified by a designated coefficient and then add the amplification reference value, to obtain amplified fingerprint peak points data; and subtract the amplification reference value from the second capacitance value corresponding to the fingerprint valley points to obtain fingerprint valley points data to be amplified, and multiply the fingerprint valley points data to be amplified by a designated coefficient and then add the amplification reference value, to obtain amplified fingerprint valley points data.

5. The terminal of claim 4, wherein the extracting module configured to acquire the source fingerprint data for fingerprint identification is configured to:

acquire a first capacitance value of capacitance formed by each pixel in the image acquisition queue of the surface of the fingerprint sensor and a fingerprint ridge point of a finger, and a second capacitance value of capacitance formed by each pixel in the image acquisition queue of the surface of the fingerprint sensor and a fingerprint valley point of the finger, when detecting that the finger is pressing the surface of the fingerprint sensor; and set the first capacitance value and the second capacitance value as the source fingerprint data for forming a simulated fingerprint.

6. The terminal of claim 5, wherein the processing module configured to repair the amplified fingerprint data is configured to:

divide all pixels of the fingerprint sensor into multiple pixel areas, each pixel area being a designated area and comprising x*y pixels, wherein x and y are natural numbers;

for each fingerprint pattern in a designated area of the amplified fingerprint data, obtain a difference between a capacitance value corresponding to a fingerprint ridge point and a capacitance value corresponding to a fingerprint valley point adjacent to the fingerprint ridge point;

determine the designated area as an abnormal area when the difference between the capacitance value corresponding to the fingerprint ridge point and the capacitance value corresponding to the fingerprint valley point adjacent to the fingerprint ridge point is greater than a preset difference threshold; and replace the capacitance value corresponding to the fingerprint ridge point and the capacitance value corresponding to the fingerprint valley point adjacent to the fingerprint ridge point with a median of capacitance values corresponding to pixels in the abnormal area, when the difference between the capacitance value corresponding to the fingerprint ridge point and the capacitance value corresponding to the fingerprint valley point adjacent to the fingerprint ridge point is greater than the difference threshold, to fill an abnormal fingerprint area completely to repair the amplified fingerprint data.

7. A terminal, comprising:

a fingerprint sensor;

a memory; and a processor coupled with the memory via a bus;

the memory being configured to store a set of program codes; and the processor being configured to invoke the program codes stored in the memory to:

acquire source fingerprint data for fingerprint identification via the fingerprint sensor, wherein the source fingerprint data comprises: capacitance values formed by each pixel in an image acquisition queue on a surface of the fingerprint sensor and each fingerprint ridge point of a fingerprint pattern, and capacitance values formed by each pixel and each fingerprint valley point of the fingerprint pattern;

extract, from the source fingerprint data, fingerprint data to be processed, wherein the fingerprint data to be processed has a fingerprint data value in a preset threshold range and comprises a first capacitance value corresponding to fingerprint ridge points and a second capacitance value corresponding to fingerprint valley points;

perform a feature amplifying process on the fingerprint data to be processed and repair the amplified fingerprint data to obtain repaired target fingerprint data;

generate a three-dimensional surface according to capacitance values of pixels of the target fingerprint data, simulate a fingerprint image via the three-dimensional surface, and compare the simulated fingerprint image with pre-stored fingerprint verification data;

determine that the source fingerprint data is identified successfully, based on a determination that the simulated fingerprint image matches the pre-stored fingerprint verification data; and determine that the fingerprint identification is successful based on a determination that the source fingerprint data is identified successfully and control a screen-operation of the terminal based on a determination that the fingerprint identification is successful, wherein the amplified fingerprint data comprises fingerprint data of fingerprint peak points corresponding to amplified first capacitance value and fingerprint data of the fingerprint valley points corresponding to amplified second capacitance value;

wherein the processor configured to perform the feature amplifying process on the fingerprint data to be processed is configured to:

acquire a median of all values of the first capacitance value and the second capacitance value and set the median as an amplification reference value;

subtract the amplification reference value from the first capacitance value corresponding to the fingerprint peak points to obtain fingerprint peak points data to be amplified, and multiply the fingerprint peak points data to be amplified by a designated coefficient and then add the amplification reference value, to obtain amplified fingerprint peak points data; and subtract the amplification reference value from the second capacitance value corresponding to the fingerprint valley points to obtain fingerprint valley points data to be amplified, and multiply the fingerprint valley points data to be amplified by a designated coefficient and then add the amplification reference value, to obtain amplified fingerprint valley points data.

8. The terminal of claim 7, wherein the processor configured to acquire the source fingerprint data for fingerprint identification is configured to:

acquire a first capacitance value of capacitance formed by each pixel in the image acquisition queue of the surface of the fingerprint sensor and a fingerprint ridge point of a finger, and a second capacitance value of capacitance formed by each pixel in the image acquisition queue of the surface of the fingerprint sensor and a fingerprint valley point of the finger, when detecting that the finger is pressing the surface of the fingerprint sensor; and set the first capacitance value and the second capacitance value as the source fingerprint data for forming a simulated fingerprint.

9. The terminal of claim 8, wherein the processor configured to repair the amplified fingerprint data is configured to:

divide all pixels of the fingerprint sensor into multiple pixel areas, each pixel area being a designated area and comprising x*y pixels, wherein x and y are natural numbers;

for each fingerprint pattern in a designated area of the amplified fingerprint data, obtain a difference between a capacitance value corresponding to a fingerprint ridge point and a capacitance value corresponding to a fingerprint valley point adjacent to the fingerprint ridge point;

determine the designated area as an abnormal area when the difference between the capacitance value corresponding to the fingerprint ridge point and the capacitance value corresponding to the fingerprint valley point adjacent to the fingerprint ridge point is greater than a preset difference threshold; and replace the capacitance value corresponding to the fingerprint ridge point and the capacitance value corresponding to the fingerprint valley point adjacent to the fingerprint ridge point with a median of capacitance values corresponding to pixels in the abnormal area, when the difference between the capacitance value corresponding to the fingerprint ridge point and the capacitance value corresponding to the fingerprint valley point adjacent to the fingerprint ridge point is greater than the difference threshold, to fill an abnormal fingerprint area completely to repair the amplified fingerprint data.

* * * * *